(12) United States Patent
Muehlebach

(10) Patent No.: US 7,726,088 B2
(45) Date of Patent: Jun. 1, 2010

(54) FLOORING SYSTEM

(76) Inventor: Moritz Andre Muehlebach, Schwerzelbodenstrasse 42, Dietlikon, Zúrich (CH) 8305

( * ) Notice: Subject to any disclaimer, the term of this patent is extended or adjusted under 35 U.S.C. 154(b) by 271 days.

(21) Appl. No.: 11/878,153

(22) Filed: Jul. 20, 2007

(65) Prior Publication Data

US 2009/0019806 A1    Jan. 22, 2009

(51) Int. Cl.
E04B 2/00    (2006.01)
(52) U.S. Cl. ............... 52/582.1; 52/592.1; 52/582.2; 403/409.1; 403/320
(58) Field of Classification Search ........... 52/592.1, 52/582.1, 582.2, 586.1, 586.2, 584.1, 592.4; 403/331, 339, 364, 381, 409.1, 371.1, 320, 403/319
See application file for complete search history.

(56) References Cited

U.S. PATENT DOCUMENTS

| | | | | | |
|---|---|---|---|---|---|
| 3,309,115 | A | * | 3/1967 | Langer | 52/582.2 |
| 3,392,497 | A | * | 7/1968 | Cushman | 52/272 |
| 3,528,690 | A | * | 9/1970 | Langer | 52/582.2 |
| 3,572,224 | A | * | 3/1971 | Perry | 404/40 |
| 3,712,013 | A | * | 1/1973 | Kalus | 52/582.2 |
| 3,712,653 | A | * | 1/1973 | Lehmann | 52/582.2 |
| 3,859,000 | A | * | 1/1975 | Webster | 404/41 |
| 4,020,613 | A | * | 5/1977 | Reynolds et al. | 403/321 |
| 4,223,500 | A | * | 9/1980 | Clark et al. | 52/309.4 |
| 4,417,430 | A | * | 11/1983 | Loikitz | 52/582.2 |
| 4,512,122 | A | * | 4/1985 | Berkowitz | 52/127.9 |
| 4,655,013 | A | * | 4/1987 | Ritland | 52/81.4 |
| 5,155,960 | A | * | 10/1992 | Shaanan | 52/584.1 |
| 5,424,118 | A | * | 6/1995 | McLaughlin | 428/314.8 |
| 6,299,224 | B1 | * | 10/2001 | Finkelstein | 292/241 |
| 7,121,058 | B2 | * | 10/2006 | Palsson et al. | 52/592.2 |
| 7,441,385 | B2 | * | 10/2008 | Palsson et al. | 52/589.1 |
| 2007/0006543 | A1 | * | 1/2007 | Engstrom | 52/582.1 |
| 2007/0028547 | A1 | * | 2/2007 | Grafenauer et al. | 52/586.1 |
| 2007/0044411 | A1 | * | 3/2007 | Meredith et al. | 52/586.1 |
| 2007/0107359 | A1 | * | 5/2007 | Zhang | 52/582.1 |
| 2008/0110125 | A1 | * | 5/2008 | Pervan | 52/582.2 |
| 2009/0100782 | A1 | * | 4/2009 | Groeke et al. | 52/589.1 |

FOREIGN PATENT DOCUMENTS

WO    WO 2008004960 A2 *    1/2008

* cited by examiner

*Primary Examiner*—David Dunn
*Assistant Examiner*—Joshua Ihezie
(74) *Attorney, Agent, or Firm*—David S. Safran; Roberts Mlotkowski Safran & Cole, P.C.

(57) ABSTRACT

A joint for connecting two adjacent flooring panels together in a substantially vertical manner includes a rotatable locking member made of plastic, metal or another resilient material. The rotatable locking member is located within a groove or opening of one flooring panel and the second flooring panel has a tongue shaped to mate with the rotatable locking member. Upon installation, the rotatable member rotates and locks around the back of the tongue via a groove above the tongue. The rotatable locking member includes a resilient arm which is bent away from its initial rest position upon installation, so that when the rotatable locking member locks onto the tongue, the resilient arm is bent providing a biasing force which holds the panel securely in position.

1 Claim, 14 Drawing Sheets

FLOORING SYSTEM

BACKGROUND OF THE INVENTION

1. Field of the Invention

The present invention generally relates to flooring systems. More particularly, the present invention relates to mechanical locking joints for connecting flooring panels.

2. Discussion of the Related Art

Flooring systems are available in a variety of forms, such as fine wood, tile (e.g. granite, brick, slate, etc.), and concrete. Laminate flooring, such as laminates and high-pressure laminate boards (HPL), may also be a popular substitute for traditional flooring materials as they tend to be generally less expensive to produce. Regardless of which type of flooring is desired, it is generally preferable to the user that installation be simple, such that it is not necessary to hire a professional to install the system.

Methods of installation for flooring systems vary greatly. Fine wood flooring may requiring complicated nailing or gluing techniques in order to lay and connect adjacent flooring panels. Tile flooring generally requires a grouting process which may be very tedious and complicated. In both cases, the hiring of a contractor or other professional may be necessary in order to install the flooring system properly.

Some of the related art flooring systems do not require gluing or nailing the flooring system to the base floor during installation. These types of flooring systems are popularly known as "floating floors" as they do not generally rigidly connect to a base floor. Many floating floors may employ some type of interlocking joint system.

One type of interlocking joint is known as a tongue-and-groove-type connection, where each board has a tongue extending along one edge and a mating groove extending along an opposite edge. Accordingly, when installing the flooring panels the tongue of one panel is fitted into the grove of an adjacent panel. Some types of tongue and groove connections for floor panels utilize a snap-together joint. With this type of connection generally the tongue or groove will have an additional protrusion or indentation that will serve to "snap" adjacent panels together when a force is exerted to push the adjacent panels together.

Related art flooring system joint connections have a disadvantage in that the floor planks when fitted together may not lie completely flush, but instead a gap or space remains between adjacent floor panels. This may be a particular disadvantage as dust, dirt, or other particles may accumulate in the gaps, creating an unattractive appearance and unsanitary conditions. Further, there stands a better chance that normal usage would serve to splinter or chip the flooring surface due to catching the surface material as allowed by the above mentioned gap.

As noted above laminate flooring offers several advantages, such as lower production cost. Further, most laminate flooring is of the "floating floor" type utilizing an interlocking joint system, which may be considered uncomplicated and easier to install. It is noted that most laminate flooring systems employ some type of decorative motif on a surface of the panels to mimic the look and feel of traditional flooring materials. In order to effectively create such a look, it may be very important to align the decorative motifs or graphics across the joints of adjacent panels. However, related joint systems in floor systems generally have the disadvantage of creating a visual disruption in the surface pattern of the laminate flooring. This significantly detracts from the visual and textural impression of system, resulting in an unattractive appearance of the flooring when it is installed.

Accordingly, what is needed is flooring system that is inexpensive, employing a joint connection that is easy to install, resulting in an aesthetically pleasing and durable appearance.

SUMMARY OF THE INVENTION

The present invention provides a mechanical locking joint connection for use with flooring systems.

Accordingly, one advantage of the present invention is to provide a mechanical joint system that connects adjacent floor panels. Another advantage of the present invention is to prove a mechanical joint system that is easy to install. Yet another advantage of the present invention is to provide a reliable connection that results in a pleasant aesthetic appearance.

Additional advantages of the invention will be set forth in the description that follows, and in part will be apparent from the description, or may be learned by practice of the invention. The advantages of the invention will be realized and attained by the structure pointed out in the written description and claims hereof as well as the appended drawings.

To achieve these and other advantages, the present invention involves an interlocking joint having a first side defining a first mating portion along a first side and a second side defining a second mating portion along a second side, said second side disposed opposite said first side; the first mating portion having a substantially arcuate groove formed therein and extending along at least a portion of the first side; a rotatable cam disposed in the groove extending in a longitudinal direction along at least a portion of the first side; the rotatable cam having a central portion, a first arm extending radially outward from the central portion along a first axis, a second arm extending radially outward from the central portion along a second axis, and a resilient arm extending radially outward from the central portion along a third axis and disposed a distance from the second arm defined by a predetermined angle; the first arm having a lever portion and a curved portion, the curved portion extending substantially perpendicular to the lever portion defining a substantially hook-shaped end; a lower lip extending outward from the first mating portion beyond the groove; said second mating portion having a tongue extending perpendicularly from said second side and extending along at least a portion of the first side and defining a substantially concave groove along an undersurface receiving said lower lip; said tongue having a substantially vertical face at least as long as the distance from the hook-shaped end of the first arm to the end of the second arm; said second mating portion further defining a locking groove formed therein above the tongue to receive the hook-shaped end of the first arm of the rotatable cam; and the second arm and the resilient arm bendable towards each other to create a biasing force, wherein the biasing force impels the third arm toward the tongue such that as the tongue advances in a direction toward the first mating portion, the curved arm of the moves into a mating position with the locking groove, thus providing a tight locking connection.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 15 shows the mechanical joint connection according to fourth embodiment of the present invention with the insert of FIG. 13 just prior to completion of installation and FIG. 16 shows the joint connection of FIG. 15 in the closed installed condition, while

DETAILED DESCRIPTION OF THE ILLUSTRATED EMBODIMENTS

Figure 1:
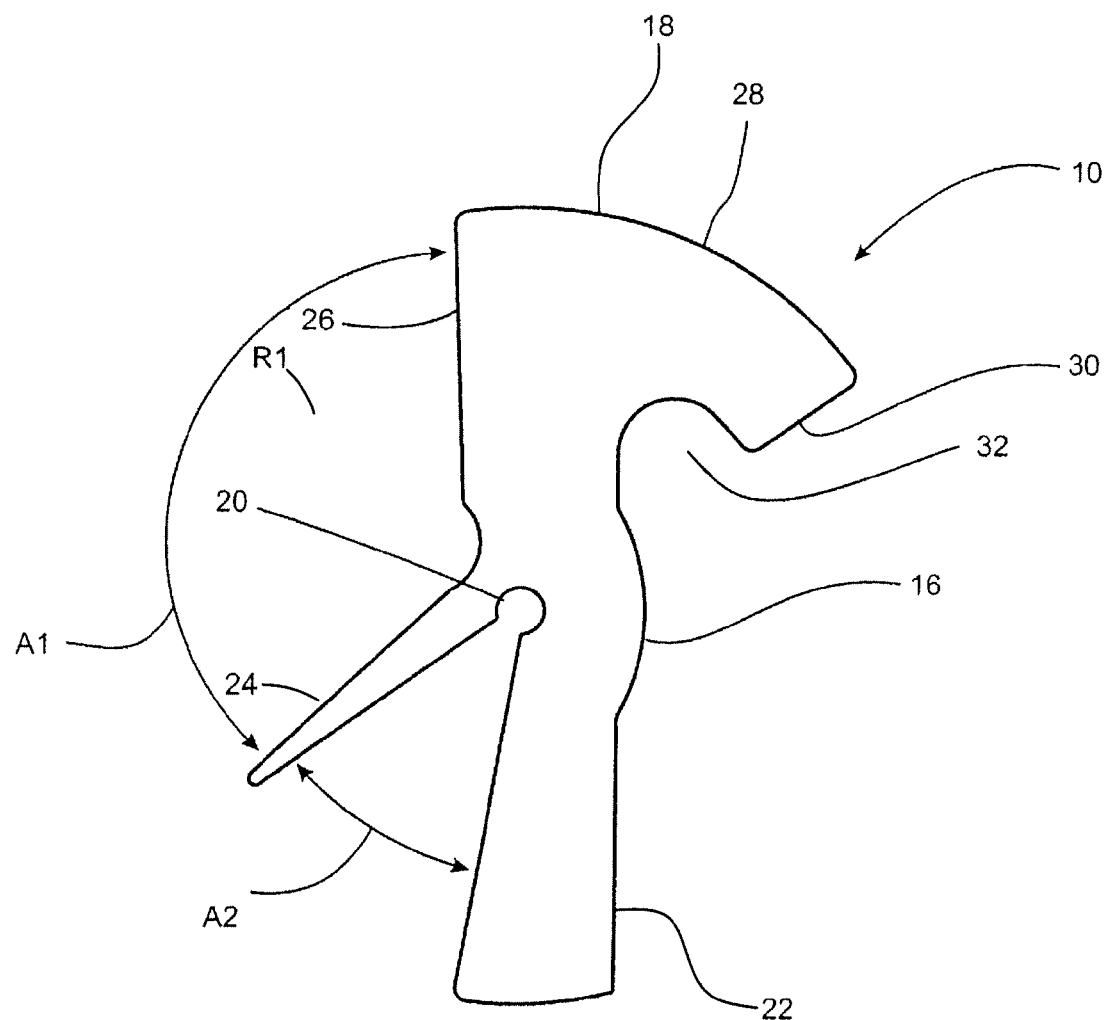
FIG. 1 illustrates a side view of an exemplary rotatable member according to the present invention.

FIG. 1 illustrates an exemplary rotatable locking member 10 according to the present invention, where the locking member 10 is in an unloaded state. Rotatable locking member 10 includes a central region 16 defined as the portion surrounding core aperture 20, and a first arm 18 extending radially from central region 16. Further, core aperture 20 has a predetermined radius R1, which may depend on the size of the rotatable locking member 10 and its particular application.

First arm 18 defines a substantially hook-shaped member. The hook-shape of first arm 18 is created by the combination of lever portion 26 and curved portion 28. Lever portion 26 may gradually increase in width as it extends from central region 16. Curved portion 28 extends integrally from an end of lever portion 26, at a point farthest from central region 16 and at a substantially perpendicular or acute angle, to end in a substantially flat contact surface 30. First arm 18 further defines an arcuate hook groove 32 at an underside of thereof.

A second arm 22 also extends radially from central region 16 in a direction substantially opposite and parallel to that of the first arm 20. Rotatable locking member further includes a resilient arm 24 extending radially from the central region 16. As illustrated in FIG. 1, second arm 22 may increase in width as it extends from central region 16, and resilient arm 24 may decrease in width. Other shapes of the second arm 22 and the resilient arm 24 are envisioned, so long as they are enabled to provide a biasing force on the system, as discussed below.

As FIG. 1 illustrates, resilient arm 24 is radially offset from the first arm 18 by predetermined angle A1, and from the second arm 22 by predetermined angle A2. In the illustrated unloaded state of FIG. 1, A1 is generally an obtuse angle and A2 is generally an acute angle. As forces begin to act upon locking member 10 A1 and A2 will change accordingly.

The rotatable locking member 10 may be made of plastic, metal, or any suitable material that is resilient in nature such that it is capable of withstanding the forces imposed by the locking joint system while still exerting a biasing force as described below.

Figure 2:
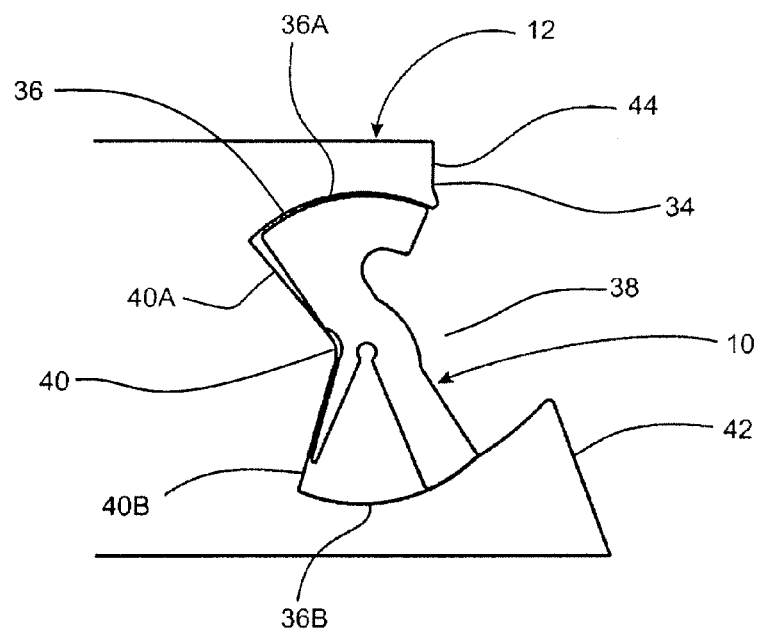
FIG. 2 illustrates a side view of the rotatable member of FIG. 1, seated in a groove within a floor panel.

FIG. 2 illustrates an exemplary embodiment where the locking member 10 is seated in a first panel 12. The panel 12 may be made from high-density fiber board (HDF), medium-density fiber board (MDF), particle board, composite, wood, or any other material used in flooring systems. First panel 12 has a first side 34 defining a first mating portion, which includes a partially arcuate groove 36, having a front, slot-like opening 38, an upper arc 36A and a lower arc 36B. Disposed between upper arc 36A and 36B is a angled back wall 40 having an upper wall 40A and a lower wall 40B. The angle between upper wall 40A and lower wall 40B is substantially the same as angle A1. Lower arc 36B ends at front side 34 to create a lower lip 42 that extends laterally in length beyond top edge 44.

Figure 3:
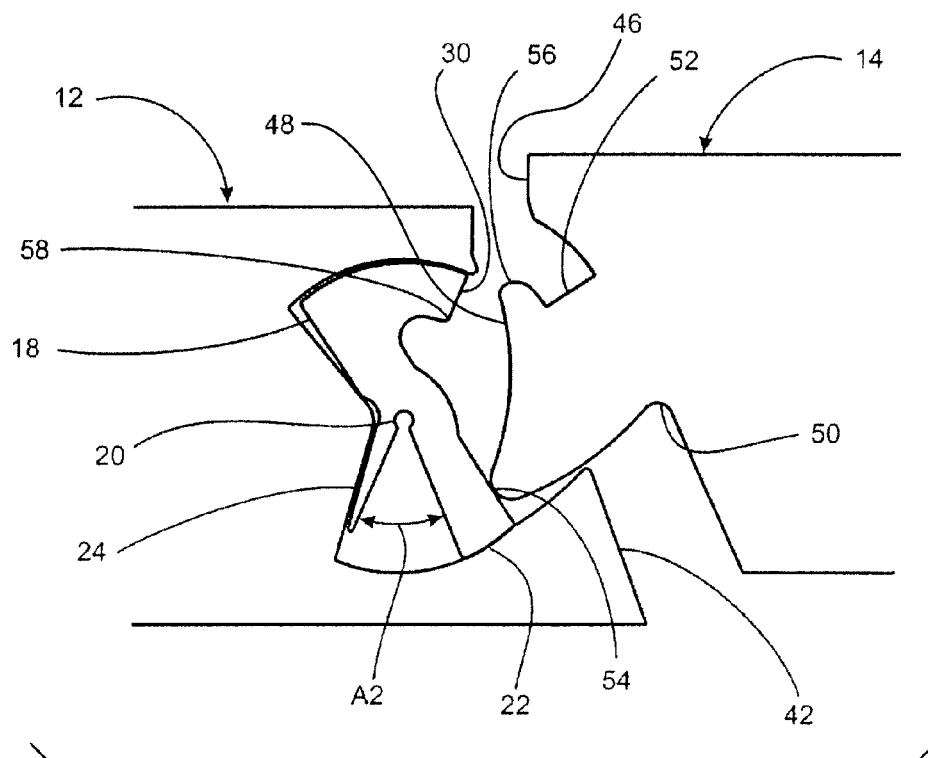
FIG. 3 illustrates a side view of the mechanical joint connection according to the present invention.

FIG. 3 illustrates the interlocking function as first panel 12, having rotatable locking member 10 seated therein, meets with second panel 14. Panel 14 may be constructed from substantially the same material as panel 12. Second panel 14 includes a second side 46 defining a second mating portion defined by tongue 48. Tongue 48 extends outwardly from second side 46 and continues along at least a portion of the length of second side 46. Further, the extension of tongue 48 from second side 46 creates a substantially concave groove 50 along an undersurface thereof and a receiving groove 52 along an upper surface thereof.

Figure 4:
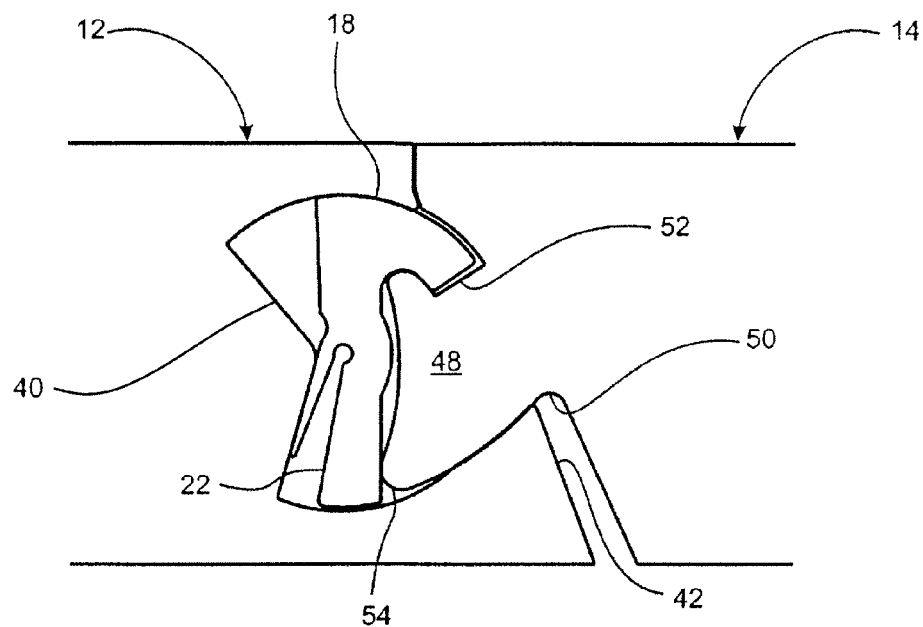
FIG. 4 illustrates a side view of the mechanical joint connection in a locked state.

During connection of panels 12 and 14, as illustrated in FIGS. 3 and 4, first panel 12 may be in place on the floor and second panel 14 is oriented substantially parallel to the floor. Second panel 14 and tongue 48 are then lowered substantially vertically into the opening 38. A bottom edge 54 of tongue 48 contacts and presses against second arm 22 of the rotatable locking member 10. As second panel 14 is pressed into first panel 12, bottom edge 54 forces the rotational movement of second arm 22 toward resilient arm 24. Resilient arm remains stationary as it lies against lower wall 40B, which imposes a reactionary force maintaining the position of resilient arm 24. Accordingly, a bias force is created about core aperture 20, thus pushing first arm 18 forward such that surface 30 contacts top edge 56 of tongue 48.

As illustrated in FIG. 3, second panel 14 moves in a substantially vertical downward direction forcing tongue 48 to move second arm 22, thus decreasing angle A2. Further, as first arm 18 moves in a direction toward second panel 14, in response to the generated bias force, angle A1 increases respectively. Contact surface 30 of first arm 18 will continue to bear against top edge 56 due to the bias force as tongue 48 moves forward into opening 38. At a point where the lower edge 58 of contact surface 30 passes upper edge 56 of tongue 48, the first arm will move immediately a distance forward. This movement may be described as a "click" into a locking position, such that curved portion 28 mates with complimentarily shaped receiving groove 52.

FIG. 4 illustrates an exemplary view of the mechanical joint system in a connected or locked position. Tongue 48 is seated in a mating relationship with a groove created by the front surface of rotatable locking member 10, hook grove 32 and lip 42. Hook-shaped first arm 18 is biased forward and seated in receiving groove 52, thus preventing vertical movement of first 12 and second 14 panels with respect to one another. Further, lower lip 42 is brought into mating alignment with concave groove 50, thus preventing horizontal movement of first 12 and second 14 panels with respect to one another. First arm 18 and second arm 22 maintain a vertical alignment in the locked position.

Figure 5:
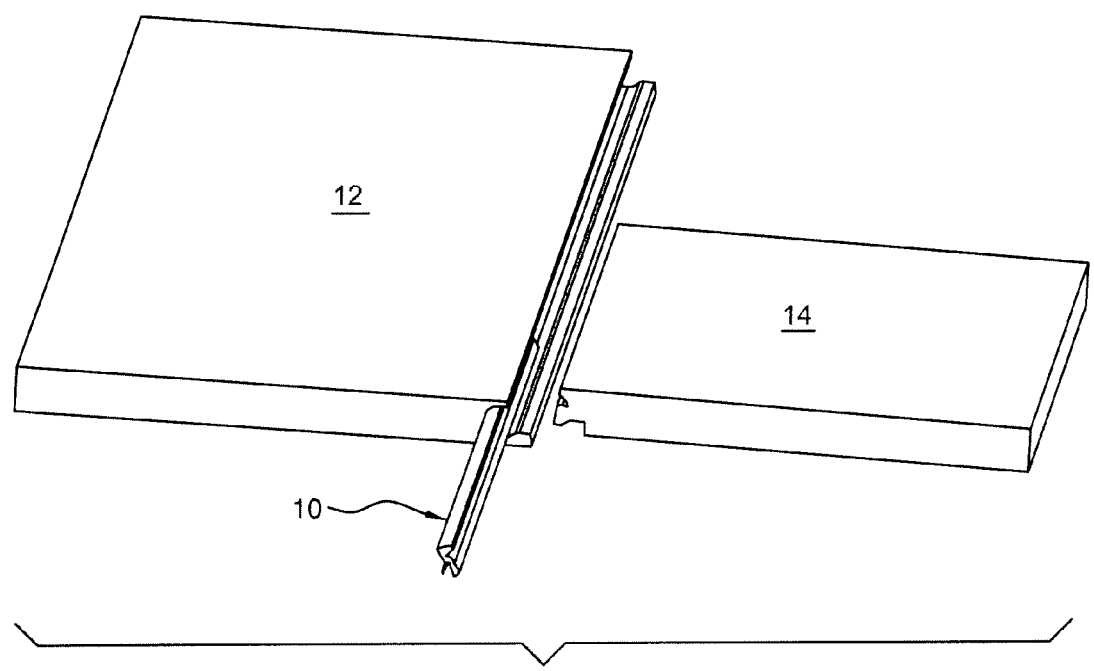
FIG. 5 illustrates perspective view of the mechanical joint and flooring system according to the present invention.

In FIG. 5 a perspective view of the exemplary joint locking system is illustrated. Locking member 10 is inserted into first panel 12 at a side wall 60 thereof, and once inserted cannot be removed through slot-like groove 38. Rotatable locking member 10 may be constructed in various lengths in accordance with the scope of the invention. That is, locking member 10 may extend along the a portion of the length of first side 34 or second side 44 (sides), or it may extend along the entire length of the sides. Further, where the locking member 10 is of a size that it does not extend along the entire length of the sides, but only a portion thereof, it is envisioned that more than one locking member 10 may be employed.

Figure 6:
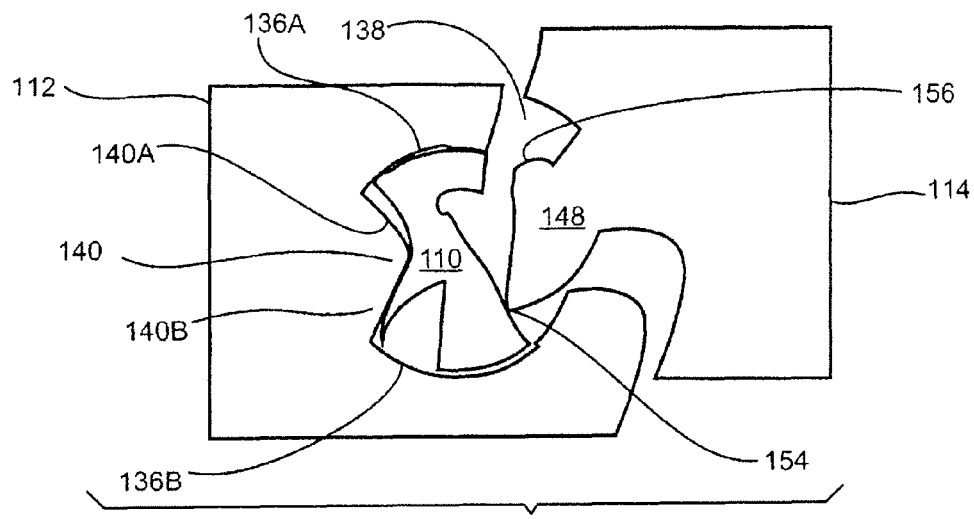
FIG. 6 illustrates a side view of a second exemplary embodiment of mechanical joint connection of the present invention.
Figure 7:
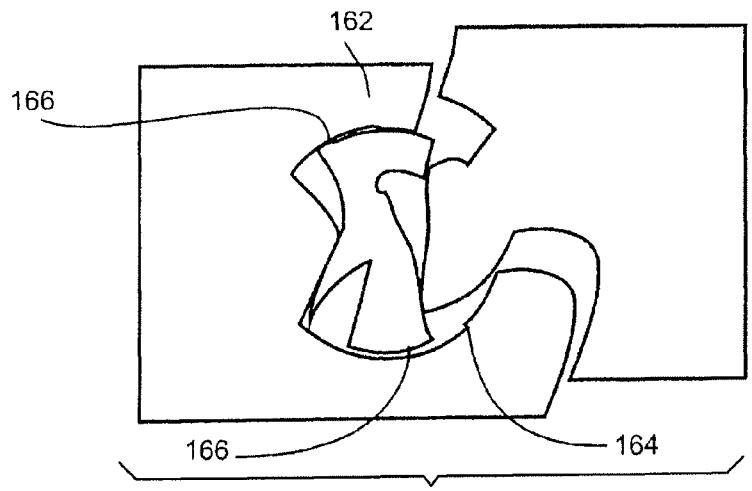
FIG. 7 illustrates the mechanical joint connection according to FIG. 6.
Figure 8:
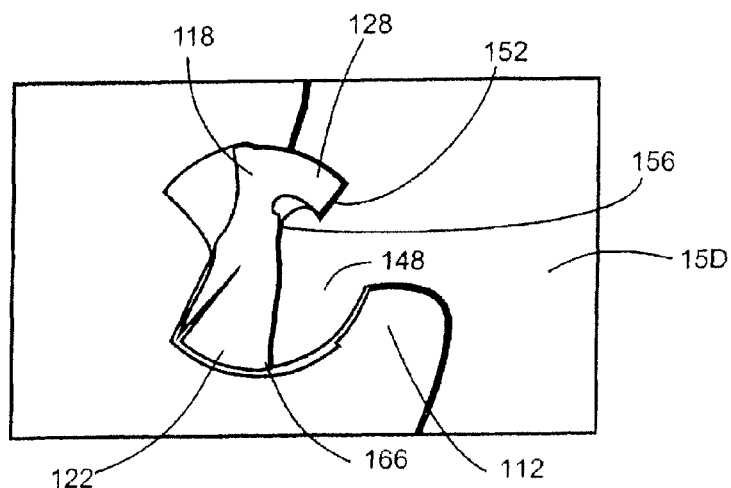
FIG. 8 illustrates the mechanical joint connection according to FIG. 6.

A further exemplary embodiment is illustrated in FIGS. 6 through 8. The mechanical operation of the joint is similar to that described above with respect to FIGS. 2 though 4. In this exemplary embodiment, second panel 114 is installed into first panel 112, and is held in place through rotatable locking member 110. The second panel 114 has a tongue 148 which mates with the rotatable locking member 110 seated in the opening 138.

As illustrated in FIG. 6, during installation, the second panel 114 is held horizontally so that the of the second panel 114 is oriented substantially parallel to the floor. The second panel 114 is lowered into the opening 138 of the first panel 112 substantially vertically, maintaining the second panel 114's substantially horizontal orientation with respect to the floor.

As illustrated in FIGS. 6 and 7, as the second panel 114 enters the opening 138, the bottom edge 154 of tongue 148 pushes the second arm 122 of the rotatable locking member 110, causing the second arm 122 to rotate towards the resilient arm 124 and the first arm 118 to rotate towards the tongue 148 until it presses against the top edge 156 of the tongue 148. The tope edge 156 of the tongue 148 prevents the first arm 118 from rotating any further. Thus as the bottom edge 154 of tongue 148 presses against second arm 122, the second arm 122 bends under increasing force towards the resilient arm 124. Because the resilient arm 124 abuts the lower wall 40B of the opening 138 in the first panel 112, the rotation of the second arm 122 under tension towards the resilient arm 124 imposes a reactionary force maintaining the position of resilient arm 124 and pushing back against the second arm 122. This creates a rotational bias force urging the resilient arm 124 and the second arm 122 apart.

When the second panel 114 completely enters the groove and lowers to its fully installed condition, as illustrated in FIG. 8, the lower lip 142 is fully inserted into the concave groove 150. Because the top edge 156 of the tongue 148 passes below the hook-shaped or curved portion 128 of the first arm 118, the tension generated by the compressed angle between the resilient arm 124 and the second arm 122 is released, causing the first arm 118 to rotate forward such that the curved portion 128 fits securely in to the groove 152.

Thus, when the present embodiment is in the installed condition, the first arm 118 and the second arm 122 are not under tension with respect to each other, however the resilient arm 124 is compressed radially against the second arm 122 creating a force pressing the tongue 148 back against the lower lip 142, and also pressing the top edge 156 back against the curved portion 128 of the first arm 118, thereby establishing a locking engagement In a further aspect of the present embodiment, as illustrated in FIG. 7, upper arc 136A and lower arc 136B of opening 138 are provided with slightly raised lip portions 162 and 164, respectively. The raised lip portion 162 and 164 engages a bump or raised tab 166 located at a top side of the first arm 118 opposite the curved portion 128 to prevent the first arm 118 from rotating out of the opening 138 causing the rotatable member 110 to fall out of the opening 138. Likewise, the raised lip portion 164 on the lower arc 136B engages the front tip 166 of the second arm 122, preventing the second arm from rotating too far in the lower arc 136B, causing the rotatable member 110 to fall out of the opening.

In this exemplary aspect of this embodiment, the raised lip portion 162 of the upper arc 136A, is placed a sort distance back from the opening 138. The raised lip portion 164 of the lower arc 136B is placed near the base of the lower lip portion 142.

In a further aspect of the invention, the raised lip portion 162 may be placed in the upper arc 136A at a position such that when the second panel 114 is completely installed and the tongue 148 is seated entirely within the opening 138 and against the rotatable member 110, the raised tab 166 on the first arm 118 hits the raised lip portion 162 before the first arm 118 returns to its initial position. This would cause there to be some tension to remain between the first arm 118 and the second arm 122 during installation to establish a tighter locking between the tongue 148, the rotatable member 110, and the first panel 112.

In yet another exemplary aspect of the present embodiment of the invention, the angle separating the resilient arm 124 and the second arm 122 can be made large enough so that prior to installation, the front tip 166 of the second arm 122 is pressed slightly against the raised lip portion 164, maintaining the rotatable member 110 stationary in the opening 138, so that during manufacturing, shipping, and transport of the flooring panels, the rotatable member is not shaken loose of the opening 138.

Figure 9:
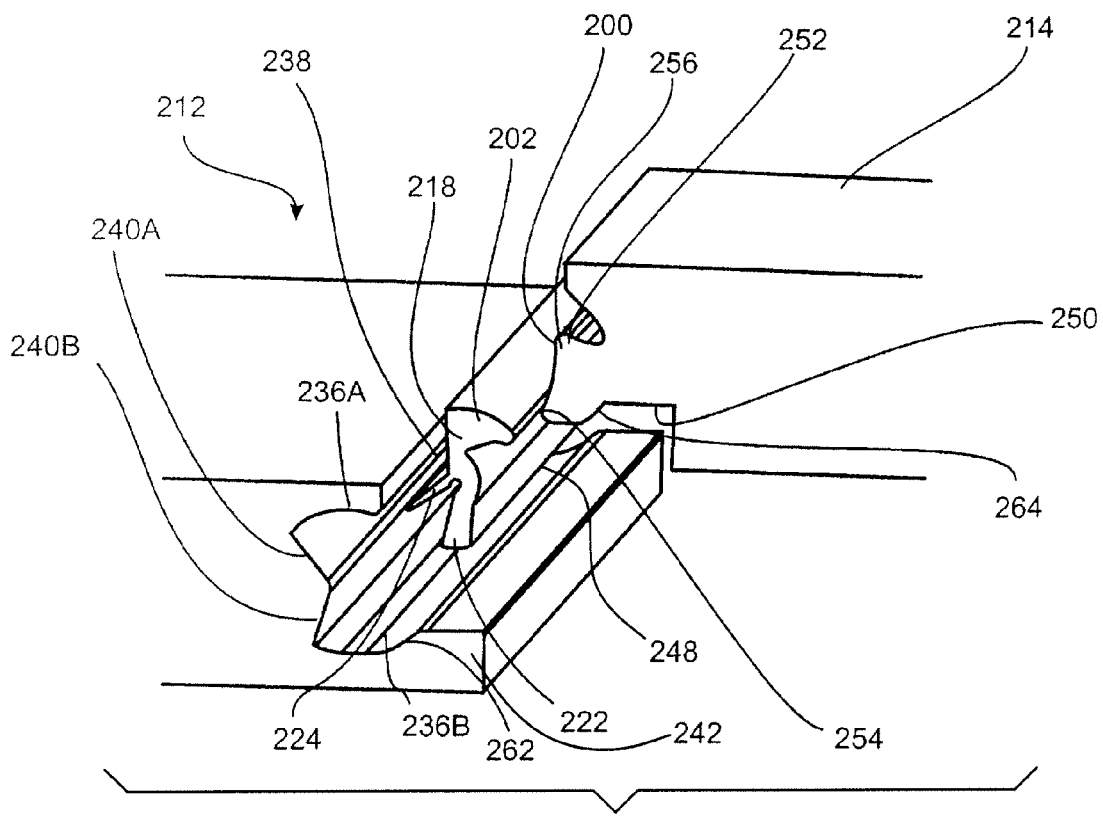
FIG. 9 is a perspective view showing mechanical joint connections according to a further embodiment of the present invention and FIG. 10 is a side view of the embodiment of FIG. 10.
Figure 10:
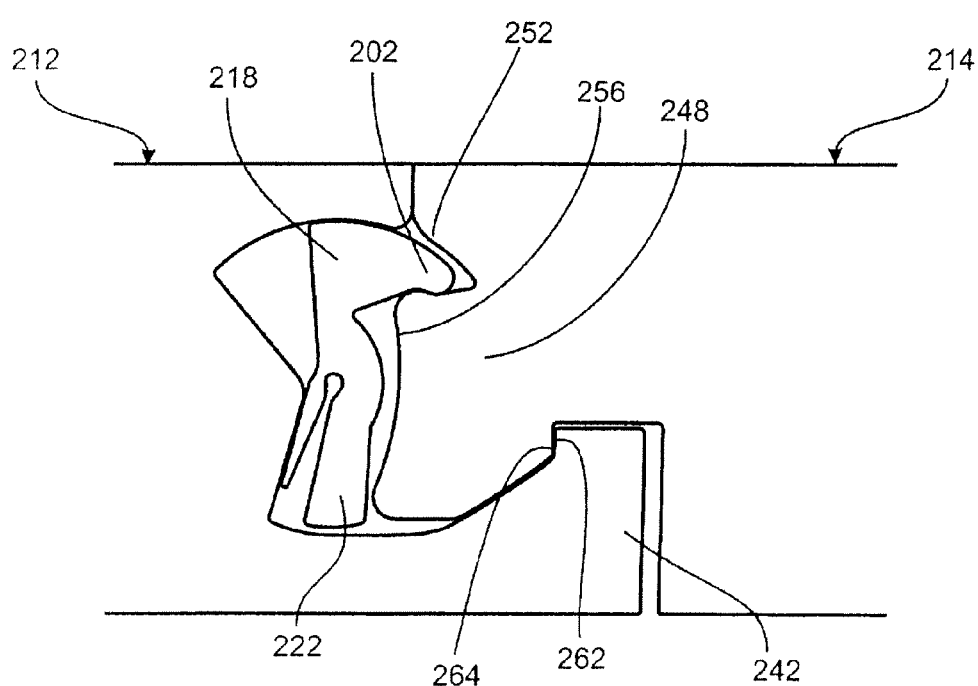

A third embodiment of the present invention is illustrated in FIGS. 5, 9, 10 and 27. In this embodiment, the rotatable locking member 200 (FIG. 27) is provided with a head 202 at the end of first arm 218 having a substantially convex shape. The rotatable locking member 200 includes a second arm 222 and a resilient arm 224 having shapes similar to second arm 18 and resilient arm 22 in FIGS. 1-4. As illustrated in FIGS. 9 and 10, as the second panel 214 enters the opening 238, the bottom edge 254 of tongue 248 pushes the second arm 222 of the rotatable locking member 200, causing the second arm 222 to rotate towards the resilient arm 224 and causing the first arm 218 to rotate towards the tongue 248 until it presses against the top edge 256 of the tongue 248. The tope edge 256 of the tongue 248 prevents the first arm 218 from rotating any further. Thus as the bottom edge 254 of tongue 248 presses against second arm 222, the second arm 222 bends under increasing force towards the resilient arm 224, which in turn is pressed against the back of opening 238. Because the resilient arm 224 abuts the lower wall 240B of the opening 238 in the first panel 212, the rotation of the second arm 222 under tension towards the resilient arm 224 maintains the position of resilient arm 224 and pushing back against the second arm 222. This creates a rotational bias force urging the resilient arm 224 and the second arm 222 apart.

When the second panel 214 completely enters the groove and lowers to its fully installed condition, as illustrated in FIG. 10, the lower lip 242 is fully inserted into the concave groove 250. Because the top edge 256 of the tongue 248 passes below the convex shaped head 202 of the first arm 218, the tension generated by the bending back of the first arm 218 against the tope edge 256 of the tongue 248 is released, causing the first arm 218 to rotate forward such that the convex shaped head 202 fits into the groove 252. In this embodiment, the convex-shaped head 202 does not engage the groove 252, thus the lower lip 242 is provided with a substantially vertical surface 262 along some portion of its perimeter which is adjacent the rear surface 264 of the tongue 248. This prevents the adjacent flooring panels 212 and 214 from sliding completely apart.

In this embodiment, the tongue may be shaped such that space may be provided between the rotational locking member 200 and the front of the tongue 248. This space gives the rotational locking member 200 some flexibility to rotate or twist as the panels are installed or taken apart.

Figure 11:
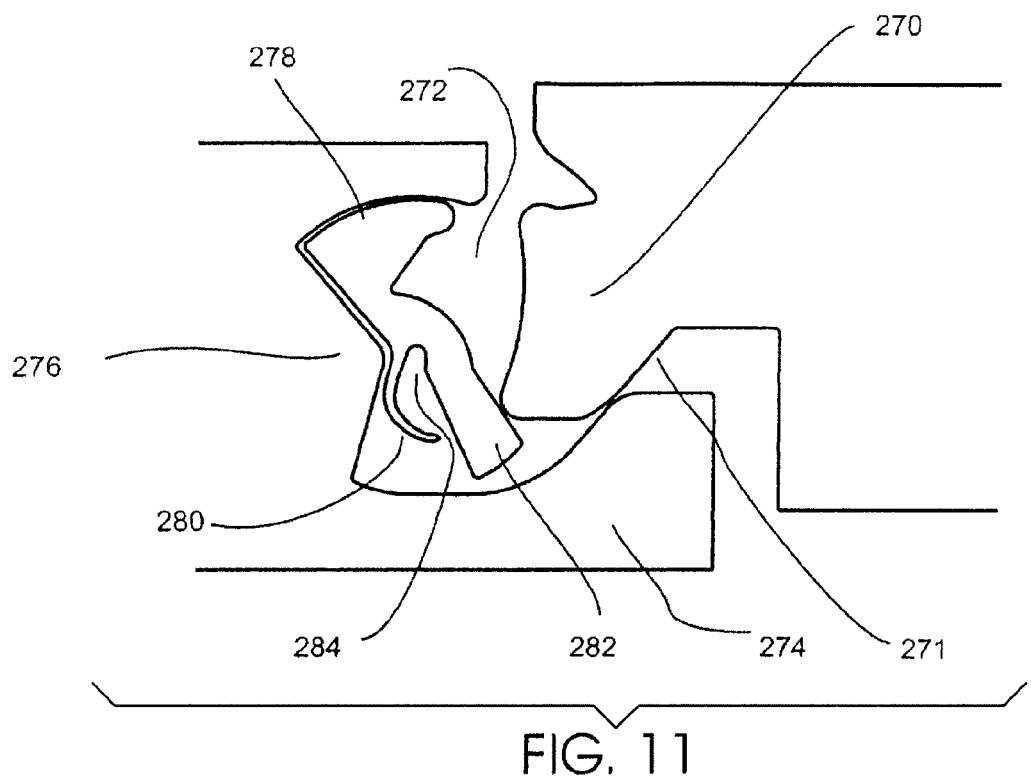
FIG. 11 shows a mechanical joint connection according to a further aspect of the third embodiment of the present invention just prior to completion of installation and FIG. 12 shows the joint connection of FIG. 11 in the closed installed condition.
Figure 12:
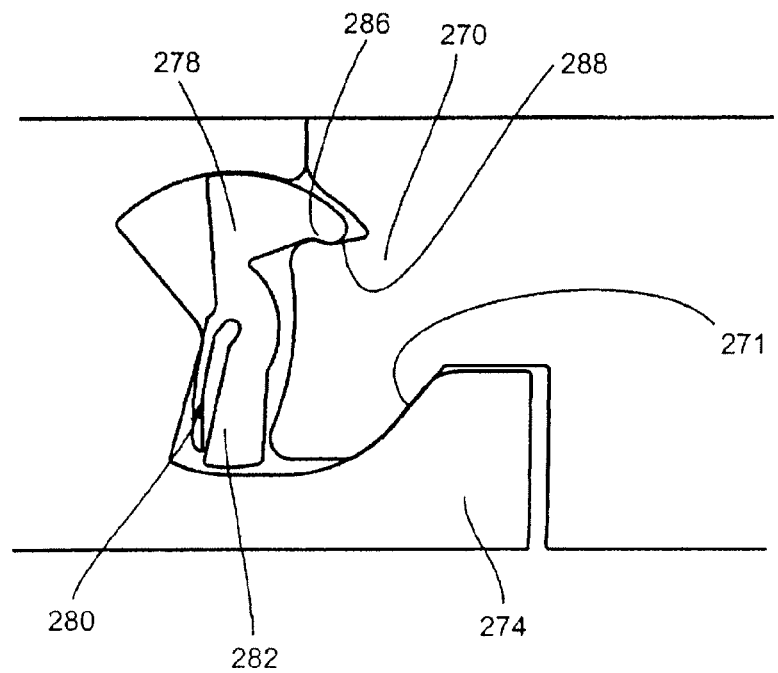

FIGS. 11 and 12 illustrate a second aspect of the third embodiment. In this aspect of the third embodiment, the tongue 270 has substantially the same shape as tongue 248 of FIG. 10, with the difference that the rear surface 271 of the tongue 270 is a substantially smooth curve, lacking the vertical portion of rear surface 264 FIG. 10. Likewise the corresponding opening in the first panel 272 does not have a vertical surface on the lower lip 274. The absence of these two features allows the tongue 270 to slide more easily into the groove and to allow the flooring panels once installed to be removed or separated more easily.

In FIG. 11, the angled back wall of the groove 276 has substantially the same shape as the angled back wall 240 of the first aspect illustrated in FIGS. 9 and 10. What differentiates this aspect of the embodiment from the previous aspect is that the rotational member 278 has a curved resilient arm portion 280, in contrast to the substantially straight resilient arm member 224 of the previous aspect of the embodiment illustrated in FIG. 9. More precisely, the curved arm portion 280 provides for greater flexibility and resiliency compared to the straight arm 224 illustrated in FIG. 9. In particular, as the tongue portion 270 is pressed into the second arm 282 of the rotational member 278, the curved resilient arm portion 280 is pressed against the angled back wall of the groove 276, causing the curved resilient arm portion 280 to be flexed, or bent, into a substantially straight position. The force exerted by the tongue 270 against the rotational member 278 is spread more evenly across the length of the curve 280, instead of being concentrated at the core aperture 284 in the center of the rotatable locking member 278. This minimizes the risk of cracking or breaking at the point where the curved resilient arm portion meets the rotational member 278.

FIG. 12 illustrates the closed position or the installed condition of two panels in this aspect of the embodiment. Here the curved resilient arm 280 has been bent straight and is under tension as the panels are joined. The convex shaped head 286 is in the closed position engaged into the hooked shaped groove 288 on the tongue. Note that convex shape head 286 and the hooked shaped groove 288 are substantially similar to the corresponding shapes in the previous aspect of the embodiment illustrated in FIGS. 9 and 10. The difference here is that by providing a curved shaped resilient arm 280 on the rotational member 278, the forces present and working against the resilient arm 280 are distributed more evenly across its length rather than being concentrated at the connection point of the resilient arm where it meets the rotatable locking member 278.

The three embodiments discussed above all share a characteristic which is that the resilient arms are connected to a point substantially near the center of the rotatable locking member and that all of these resilient arms are substantially thinner than either arm of the rotatable locking member. Depending upon the type of material used to build the rotatable locking member, the forces acting upon the resilient arm may exceed the tolerances of the material, causing the arm to crack at the point of connection when the arm is subject to those forces. In other words, when the rotatable locking member is forced against the tongue of the second panel and the rotatable locking member turns forward pushing the resilient arm against the angled back wall of the groove, the resilient arm of the rotatable locking member may crack. Depending on the type of material used in the rotational member 278, it is even possible in this context for the curved resilient arm portion 280 of FIGS. 11 and 12 to crack.

Figure 21:
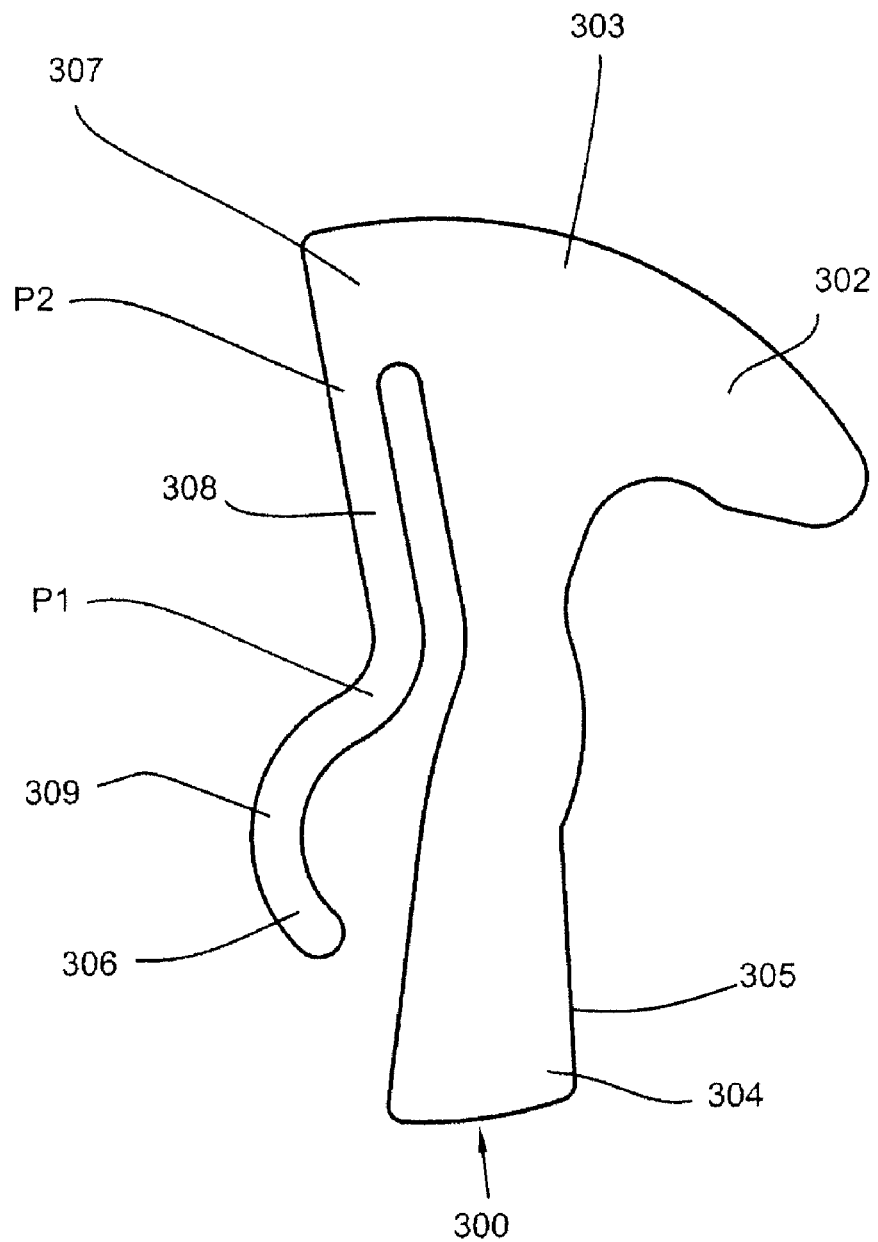
FIG. 21 illustrates a side view of an exemplary rotatable member according to the present invention.

A number of possible ways to overcome this problem are presented herein. For example, FIG. 21 illustrates a rotatable locking member 300 having a convex shaped head 302 at the end of a first arm 303, which is opposite a second arm 304 at the other end of the rotatable locking member 300. The rotatable locking member 300 does not have a core aperture as seen in previous embodiments of the invention. However, rotatable locking member 300 has a resilient arm 306 that is connected substantially near the top and back of the first arm 303. This point of connection 307 is substantially away from both the center of the rotatable locking member as well as the point on the resilient arm 306 where the rotatable locking member will be forced against the angled back wall of the groove. In this third aspect of the embodiment the groove into which the plastic rotatable locking member 300 is placed is substantially similar to the angled grooves seen in previous aspects of this embodiment in FIGS. 1 through 12. In its operation, rotatable locking member 300 with resilient arm 306 is initially in an open position in which the second arm 304 is projected out into the opening of a groove into which it sits, the tongue of the adjacent panel will press against the front face 305 of the second arm rotating the rotatable locking member so that the convex shaped head 302 swings forward to engage the corresponding hooked shaped groove in the tongue.

In this aspect of the embodiment the resilient arm 306 has a substantially straight portion 308 extending from the point of contact to some point along a portion of the length of the resilient arm and then a curved portion 309 from that point after the straight portion 308 to the end of the resilient arm. The curved portion presses against the rear surface of the angled groove and as the rotatable locking member is rotated towards the closed position, this curved portion 309 of the resilient arm 306 will be subject to forces and compress. However, given the shape of the resilient arm, the forces will be distributed along the length of the curved portion 309 at the point where the curved portion meets the straight portion 308, this point is referred to as P1, and at a second point, P2, where the straight portion of the resilient arm 308 meets the first arm 303. It is contemplated that P1 and connection point 307 may be the same point.

Because the forces from the installation of the flooring panels are distributed along the length of the curved portion 309 at P1 and P2, no single point is subject to all the force of the resilient arm being pressed against the angled back wall of the groove, thus making rotatable locking member 300 less likely to crack at the point where the resilient arm 306 meets the first arm 303.

A fourth embodiment of the invention is presented with reference to FIGS. 13 through 18. In the previously discussed embodiments, it may be possible, given the material out of which the rotational members are made and the material out of which the flooring panel is made, for the rotational member to slide or fall out of the groove in the first panel. In particular, during manufacturing or shipping of the flooring product having such rotational members, the rotational members may become dislodge or may fall out of the grooves in the panels entirely. It then becomes difficult for the installer to locate the rotational member in the product and re-insert it into the groove easily and without damaging it. This fourth embodiment addresses this problem, among others.

In a first aspect of this embodiment, a plastic insert member 400 is provided with a first slot portion 402 and a rotatable locking member portion 404. The slot portion 402 and the rotatable locking member portion 404 are connected by an S-shaped resilient coil 406. The entire plastic insert member 400 is a single unitary and integrated body. In the first aspect of this invention illustrated in FIG. 13, rather than a rib, an axial extension portion 408 is complemented by an axial groove or notch 409 at the rear surface of the rotatable locking member 404. In a second aspect of the invention, illustrated in FIG. 14, the slot member 402 and the rotatable locking member portion 404 are additionally connected to one another by a rib 407 located at the tip of an axial extension or portion 408 which meets the center portion of the rear surface of the rotatable locking portion 404.

Figure 13:
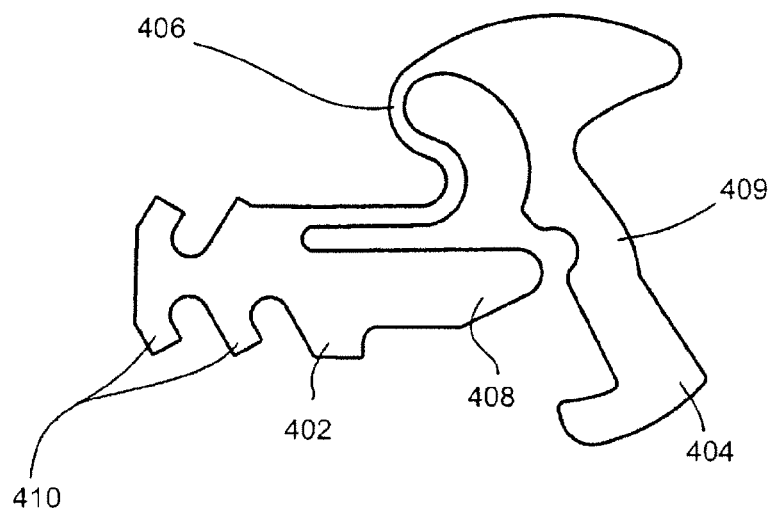
FIG. 13 is a side view of an exemplary rotatable insert member according to the fourth embodiment of the present invention having a groove instead of a rib.
Figure 14:
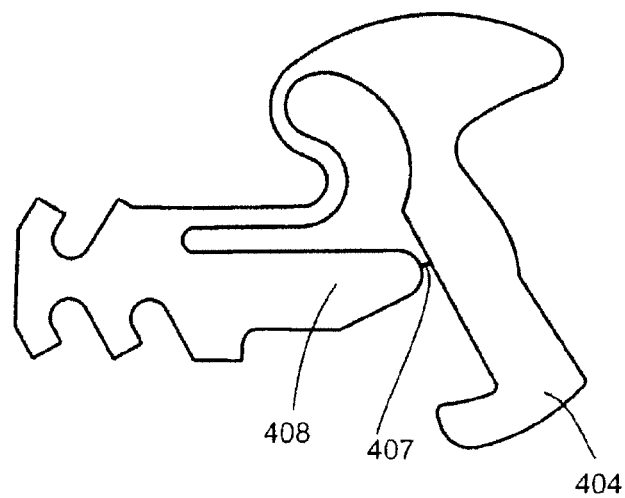
FIG. 14 is a side view of a similar insert member, but which has a connection formed instead of a groove or rib.

Additionally, both aspects illustrated in FIGS. 13 and 14, include a number of teeth or flanges 410 at an end portion of the slot member 402 opposite the axial extension 408 which allow the slot insertion portion 402 to slide into a corresponding groove formed into the first panel but prevent the slot insertion portion 402 from sliding out, thus holding the slot member 402 firmly in place while allowing the rotatable locking member portion 404 to rotate freely.

Figure 15:
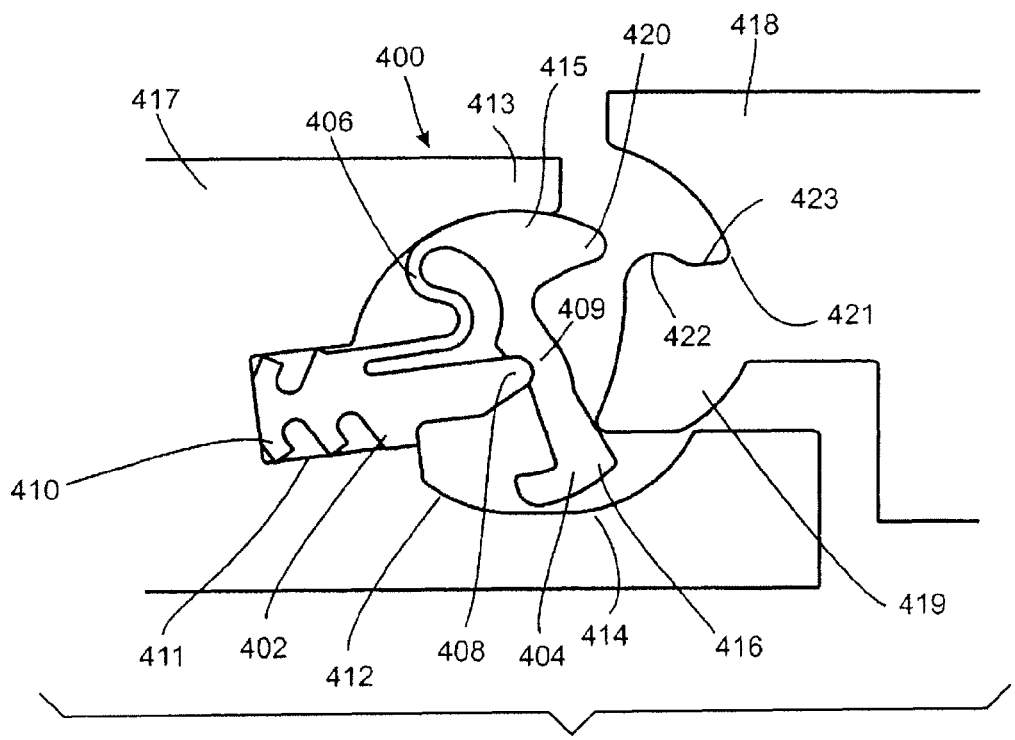

FIG. 15 illustrates the insertion member 400 of FIG. 13 inserted within a primary groove 412 having a rear slot 411, a top arcuate surface 413 and a lower arcuate surface 414. The insertion member 400 is inserted into the groove 412 such that the slot member 402 is secured within the groove 413 via the flanges or teeth 410. This is accomplished by making the thickness of the slot insertion member 402 as measured from the tip of the teeth on opposite sides to be slightly greater than the width of the groove 413. For example, the thickness of the slot insertion portion 402 may be 0.1 mm thicker than the width of the opening of groove 413.

In the open position illustrated in FIG. 15, in which the resilient coil 406 is at its rest, or contracted position, the rotatable locking member portion 404 having a first arm 415 and a second arm 416 hangs freely via the S-shaped coil 406 which is in turn connected to the slot insertion portion 402 secured in the rear groove 413. The shape of the coil when it is formed determines its rest position. If the coil is formed in a wound-shape as in FIGS. 13-15, then stretching the coil straight or in an unwound position will create tension in the coil, which tries to pull the coil back to its original shape. By contrast, if the coil is formed in a substantially straight or unwound shape (see FIG. 22 below), then winding it or coiling the coil with create tension that urges it to be released to its original straightened position.

When a second panel 418 is engaged with the first panel 417, the tongue portion 419 of the second panel 418 presses against the second arm 416 of the rotatable locking member portion 404 of the insertion member 400. As the tongue presses against the second arm 416, the rotatable locking member portion 404 is pushed back against the slot member so that the axial extension 408 enters and pressed against the axial groove 409. Thus, the tip of the axial extension 408 pressed into the axial groove 409 becomes the point around which the rotatable locking member portion 404 rotates. As the tongue 419 is pushed further into the groove 412, the rotatable locking member portion 404 rotates under tension so that the convex shaped head 420 enters and locks into the hooked shaped groove 421. The hooked shaped groove 421 is designed such that the leading edge 422 over the hook shaped groove 421 is slightly higher than the bottom surface 423 of the hook shaped groove 421. This allows the convex shaped head 420 to enter the hook shaped groove 421, touch the bottom surface 423 and be held in place in a horizontal direction by the slightly higher leading edge 422.

The rotation of the rotatable locking member portion 404 occurs under tension provided by the resilient coil 406. Specifically, while the rotatable locking member rotates around the tip of the axial extension 408 pressed into the axial groove 409, the resilient coil 406 becomes uncoiled or straightened as the convex shaped head 420 rotates forward. The extension of resilient coil 406 occurs under tension, urges the rotatable locking member portion 404 to rotate back to its original open position. However, the rotatable locking member is forced to rotate towards the closed position by the force exerted by the tongue 419 against the second arm 416.

Figure 16:
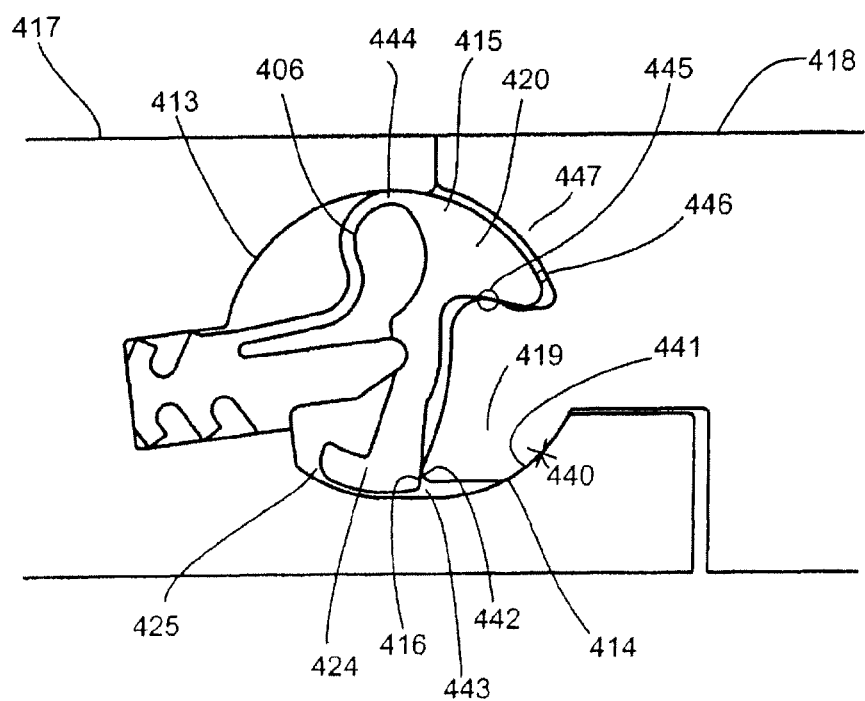

The closed position of the joint according to this aspect of this embodiment of the invention is illustrated in FIG. 16. Here, the resilient coil 406 is shown in its extended or unwound position exerting force opposing the rotation of the rotatable locking member portion 404 towards the closed position. Furthermore, at the end of the second arm 416 the rotatable locking member portion 404 has a rear protrusion 424 whose outer surface 425 has an arcuate or curved shape. The purpose of this rear extension 424 with the arcuate outer surface 425 is to facilitate sliding of the rotatable locking member portion 404 against the surface 414 of the groove 412 as the rotatable locking member portion 404 rotates from the open position to the closed position. This is helpful in circumstances where the material of the rotatable locking member portion 404 and the material of the first panel 417 would otherwise exert significant friction against one another. More particularly, the arcuate shaped outer surface 425 provides for a smoother rotation of the rotatable locking member than would be present if the rear extension 424 were not present.

In addition, FIGS. 15 and 16 illustrate a further aspect of the embodiment in which the rear groove 413 is not parallel to the upper surfaces of the panels 417 and 418 but is rather at an angle. A variety of placements of this rear groove 413 are contemplated by the present invention. Particularly, the groove depth, angle and vertical position within the first panel 417 are selected to provide enough room above the slot member 402 and behind the rotatable locking member portion 404 into which the resilient coil member 406 can wind and unwind in the open and closed positions, respectively. By allowing for greater space in this region where the resilient coil 406 will be present allows the coil to be made longer or with a variety of shapes, such as an S-shape, a zigzag or accordion shape, a bowed shape or the like. By allowing for a longer resilient coil 406, all the forces acting upon the rotatable locking member 404 are distributed along the length of the curve and not concentrated around a single point.

Figure 17:
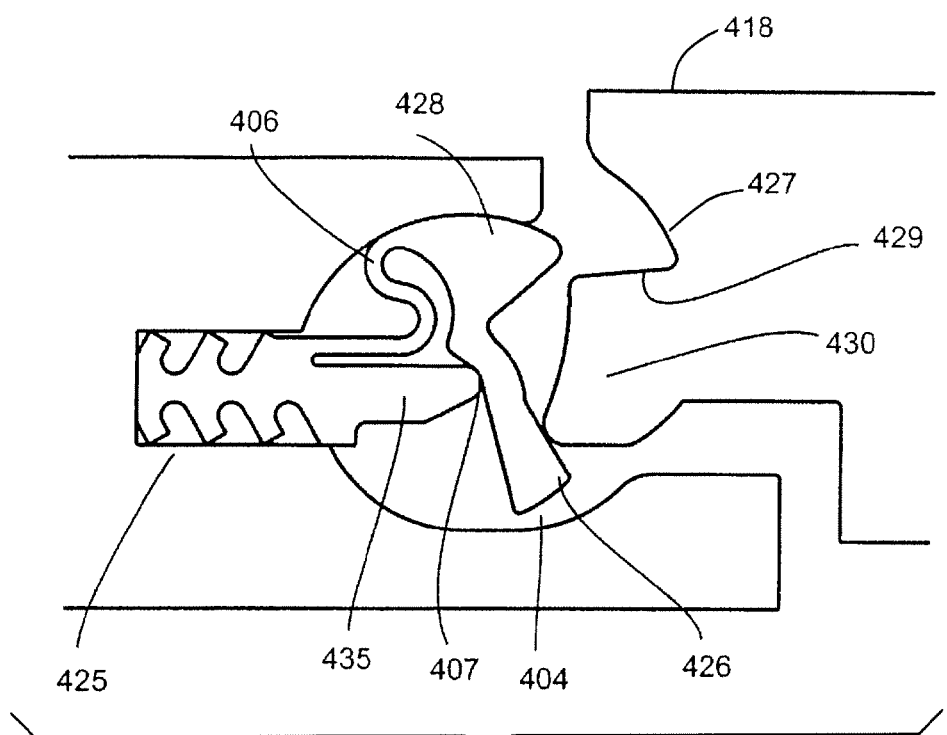
FIG. 17 shows the mechanical joint connection according to the fourth embodiment of the present invention with the insert of FIG. 14 just prior to completion of installation and FIG. 18 shows the joint connection of FIG. 17 in the closed installed condition.
Figure 18:
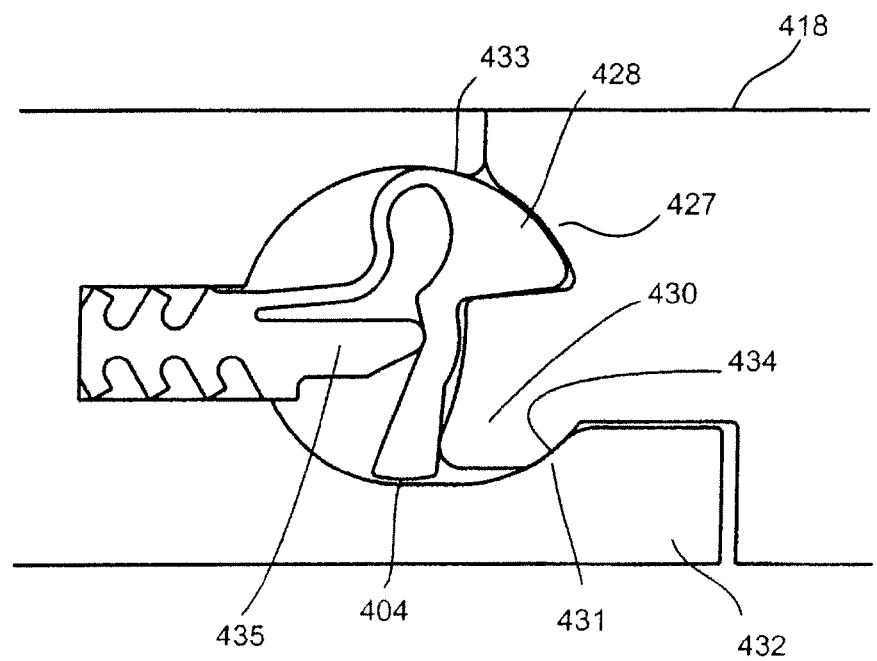

The S-shape or a continuous curve is better than a zigzag shape, provided there is enough room for it in the groove, because the zigzag shape will suffer extremes of tension at the vertexes of the angles, where the portions of the accordion fold, whereas an S-shaped or other shaped continuous curve will have the forces distributed continuously along its length. This resists breakage and cracking better than a zigzag or accordion shape. However, it is understood that the invention is not limited to any particular shape of coil connecting the rotatable locking member to the slotted insertion member. FIGS. 17 and 18 illustrate further aspects of the present embodiment in which the insertion member of a second aspect illustrated in FIG. 14 is inserted into a rear groove 425 that is substantially parallel to the upper surface of the flooring and placed in substantially the center of the panel. In this embodiment, the operation of the joint is substantially similar with a few notable exceptions.

In FIG. 17, the upper groove 427 of the second panel 418 does not have a hook shape but is rather a convex shape that is substantially smooth or flat along the lower surface 429. This corresponds to the shape of the convex shaped head 428 of the rotatable locking member portion 404 which is a substantially triangular shaped head with a rounded tip. In this embodiment, there is no hooking mechanism when the head 428 is inserted into the upper groove 427 by which the tongue 430 is held against the locking member 404. In this aspect, the resilient coil 406 is substantially similar to that of the previous aspect illustrated in FIGS. 13, 15 and 16. Returning to FIG. 17, because the axial extension 435 in this aspect is connected to the rotatable locking member portion 404 by a rib 407, it is not necessary for the second arm 426 to extend the entire radius of the lower half of groove from the axial extension 408 to the bottom surface 431 of the groove opening. Rather, it is sufficient that the second arm only be long enough to be engaged by the tongue 430 as it enters the groove.

FIG. 18 illustrates this aspect of this embodiment of the invention in which the insertion member is in a closed position. Here, the rotatable locking member portion 404 is in the closed position with the convex shaped head 428 secured in the groove 427 and in which the tongue portion 430 is pressed against a rear arcuate surface 431 of the lower lip portion 432 of the groove. When locked in this position the tongue 430 and the second panel 418 are secured both vertically and horizontally within the groove. They are secured vertically by the presence of the convex shaped head 428 of the rotatable locking member which in turn presses against the upper arcuate surface 433 of the groove. Thus, the top of the rotatable locking member 404 is pressed against the upper arcuate surface 433 of the groove. The upper surface of the tongue 430 is pressed against the lower surface of the convex shaped head 428 and the lower arcuate surface 431 of the groove is pressed against a lower rear surface 434 of the tongue. This holds the tongue securely in place against the rotatable locking member portion 404.

Within this embodiment a number of points are important to the mechanical operation of the joint. First, the placement of the slot portion of the slot groove 413 in the rear wall of the groove 412 is not critical provided that it provides enough room above the slot portion 402 for the resilient coil 406 to wind and unwind within that space. The greater the space provided, the greater the length that coil may be which allows greater forces to be distributed along its length. This greater force will contribute to a more exaggerated or a more pronounced snap action when the rotatable locking member engages the groove above the tongue and enters the closed position.

In FIG. 16, certain points of contact and certain gaps provided within the joint enhance its operation. There is a first point of contact 440 where the rear wall 441 of the tongue 419 touches or abuts the arcuate curve 414 of the groove 412. This point 440 will be referred to as the first point of contact. A second point of contact 443 is where the lower tip 442 of the tongue 419 presses against the second arm 416 of the rotatable locking member 404. A third point of contact 444 is present where the upper arcuate surface 413 touches the top of the first arm 415 of the convex shaped head 420. The fourth point of contact 445 is present where the raised tip 422 of the hook shaped groove 421 touches the under surface of the convex shaped head 420.

These four points of contact, the first point of contact 440, the second point of contact 443, the third point of contact 444, and the fourth point of contact 445, provide for a continuous transmission of force throughout the joint to maintain the first and second panels 417 and 418 in a secured and locked position relative to one another. Specifically, the second panel 418 is held in place in the vertical direction because any movement vertically will cause the tongue 419 to press against point 445 with greater force. That force will be transmitted through the body of the convex shaped head 420 to where the first arm 415 meets the first panel 417 at point 444. Because the points 440, 444 and 445 are in contact when the joint is in the closed position, there is no room for the second panel 418 to move in the vertical direction. Likewise, in the horizontal direction, the first point of contact 440 and the second point of contact 443 immobilize the tongue in a horizontal direction making it impossible for the tongue of the second panel to move out from the joint in a horizontal direction.

In order to uninstall the joint, the second panel 418 is rotate at an angle causing the rotatable locking member portion 404 to rotate back towards its original open position, thus allowing the tongue to escape from the now open groove. By precisely controlling the size and shape of the joint in this manner, the two adjacent panels 417 and 418 may be locked so that their upper surfaces are at substantially the same plane so that they are locked relative to one another and so that there is no play in the joint, but also allowing the panels once joined to be easily separated.

Furthermore, by providing some tolerance within the joint it may be possible to provide some measure of play if this is desired. This can be achieved by making the rear surface of the tongue slightly narrower so that the tongue may move back against the lower arcuate group 414 of the groove 412.

In addition to these points of contact, a gap 446 is provided between the convex shaped head 420 and the upper wall of the hook shaped groove 447. This gap is important because it facilitates smooth movement and rotation of the convex shaped head snapping forward into the hook shaped groove when the rotatable locking member passes from the open to the closed position. This reduces the friction, allows the joint to operate more smoothly and provides for a more audible and pronounced snapping action when the joint closes.

Figure 19:
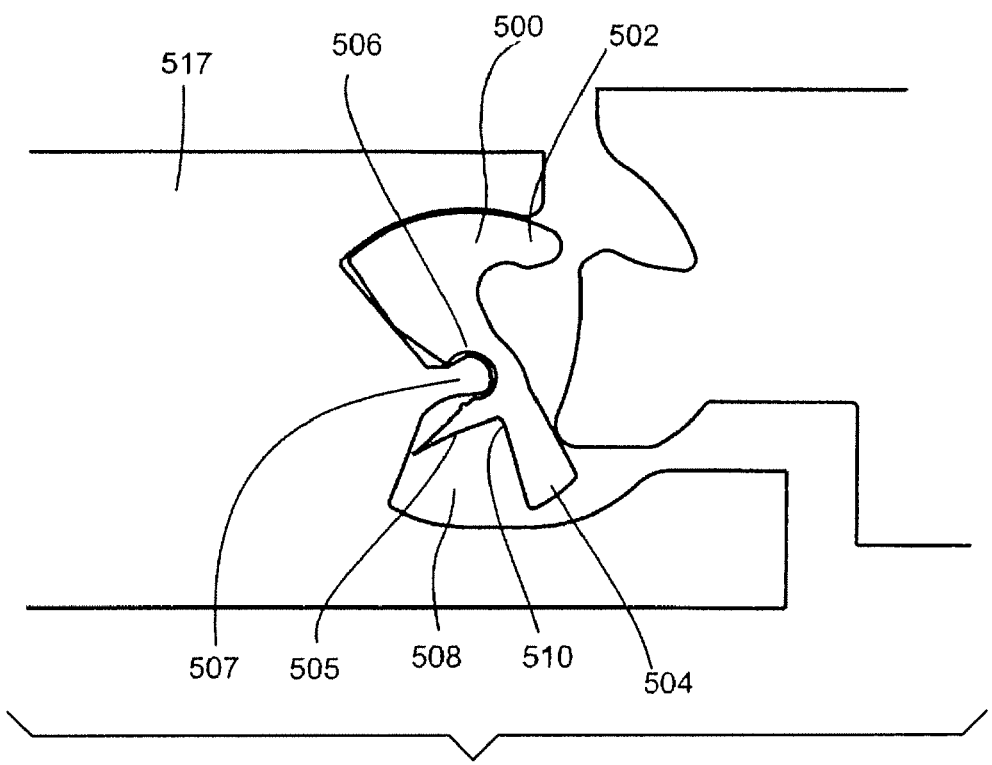
FIG. 19 shows a mechanical joint connection according to a fifth embodiment of the present invention just prior to completion of installation and FIG. 20 shows the joint connection of FIG. 19 in the closed installed condition.
Figure 20:
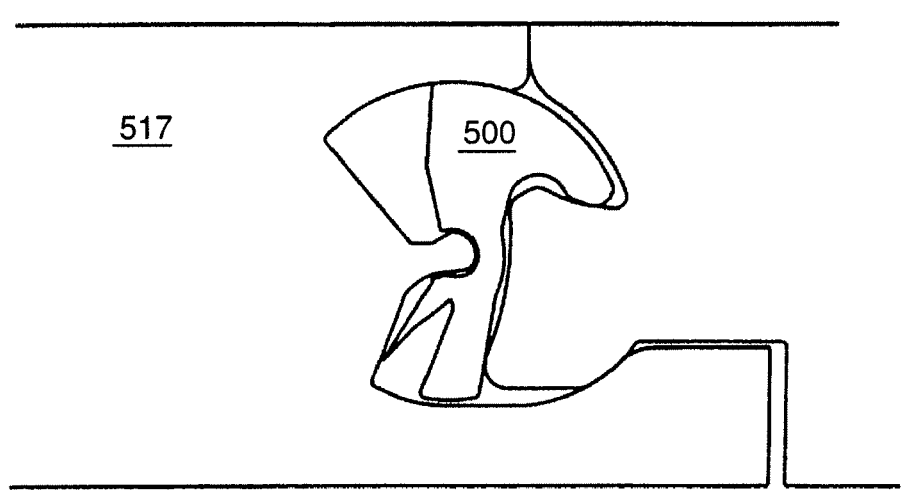

A fifth embodiment of the present invention is illustrated in FIGS. 19 and 20. In this embodiment, rather than an axial extension at the end of a slot member secured into a groove at the rear of a main groove in the first panel 417, this embodiment illustrates an insertion member 500 having a hooked shaped head 502, a second arm 504, a resilient arm 505 and a core aperture 506. What differentiates this embodiment from the previous embodiments is that the rotatable member 500 is secured in place through a protrusion 507 formed into and as part of the back wall of the groove 508. Because it is made from the core material of the first panel 517, this protrusion 507 acts as the axis of rotation around which the rotatable locking member 500 will rotate.

The operation of the joint is substantially similar to the embodiments heretofore discussed, with the insertion member moving from an open to a closed position as the panels are joined. In this embodiment, the resilient arm 505 engages the rear surface of the groove 508 underneath the protrusion 507. Furthermore, the closed position of this joint illustrated in FIG. 20 is substantially similar to the closed position of the joint illustrated in FIG. 4 with the exception that the rotatable locking member rotates not around the point of force of the resilient arm but rather rotates around the protrusion 507. Thus, a difference between this embodiment and the first embodiment illustrated in FIGS. 1 through 4 is that the axis of the rotation of the joint is separate from the point around which the rotatable locking member is provided with force which is the contact point 510 between the resilient arm 505 and the second arm 504. Because all of the force of the rotation is concentrated where the resilient arm 505 meets the second arm 504 at the point 510, the forces acting at the protrusion 507 are not substantial and yet the joint is still provided with the locking action similar to that of the first embodiment. Thus this embodiment shares a common characteristic with the embodiment illustrated in FIG. 21 which is the separation of the axis of rotation of the rotatable locking member from the point of contact between the resilient arm and the main body of the rotatable locking member which is also the point where all of the rotational force will be concentrated.

A sixth embodiment is illustrated in FIGS. 22 through 26, in which a insertion member having a rotatable portion provided a locking operation in which the rotatable member moves from a closed position, to a open position during locking, back to the closed position after locking. In a first aspect of this invention, illustrated in FIG. 22, insertion member 600 is provided with a rotatable member 602 having a convex head 604. The insertion member 600 has a main body 605 with an arcuate groove 606 formed on an upper surface 607. The insertion member 600 also has a slot insertion portion 603 substantially similar to the slot portion 402 illustrated in FIG. 13. The slot insertion portion 603 may have one or more teeth or flanges 608 that facilitate securing the slot insertion portion 603 into a corresponding slot at the rear of a groove. In addition, rotatable member 602 has a single arm 609 with a rounded or blunt tip 610 shaped and sized to correspond to the arcuate groove 606 formed in the main body 605. The rotatable member 602 is connected to the slot member 603 via a resilient coil 611. In the present aspect of the present embodiment, the resilient coil is shown with an S-shape but it is well within the scope of the invention for the coil to have any of a variety of shapes which are flexible and able to distribute force along their length.

Figure 23:
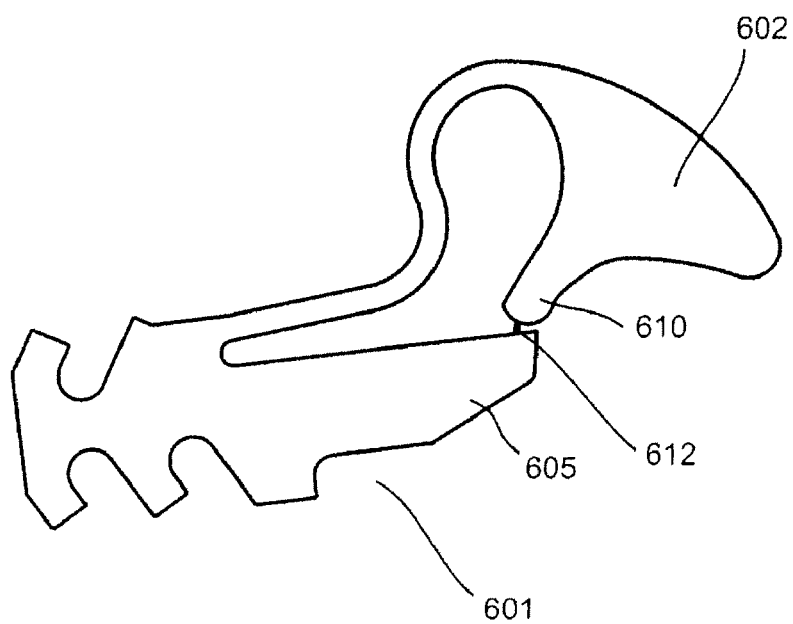

In an alternate aspect of this embodiment, illustrated in FIG. 23, rather than an arcuate groove 606 at the upper surface 607 of the main body 605, the upper surface 607 is substantially flat with a rib 612 connecting the tip 610 of the rotatable member 602 to the main body 605. This rib provides additional support and also provide tension or resistance in addition to the tension supported by the coil 611.

Figure 22:
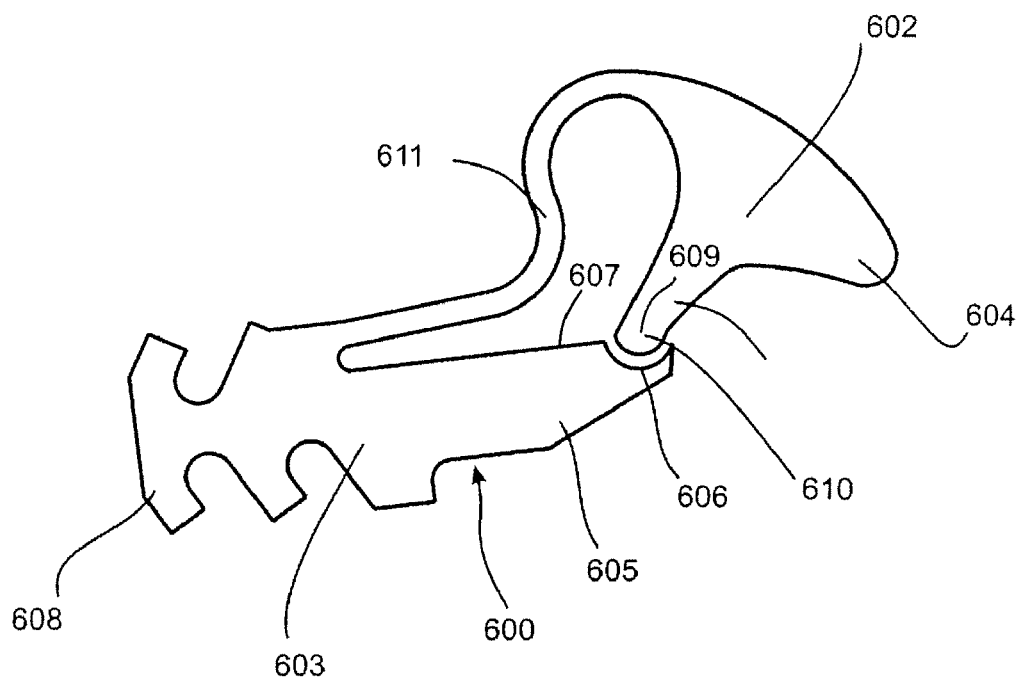
FIG. 22 is a side view of an exemplary rotatable member according to the sixth embodiment of the present invention having a groove and FIG. 23 is a side view of a similar insert member, but which has a connection instead of a groove.
Figure 24:
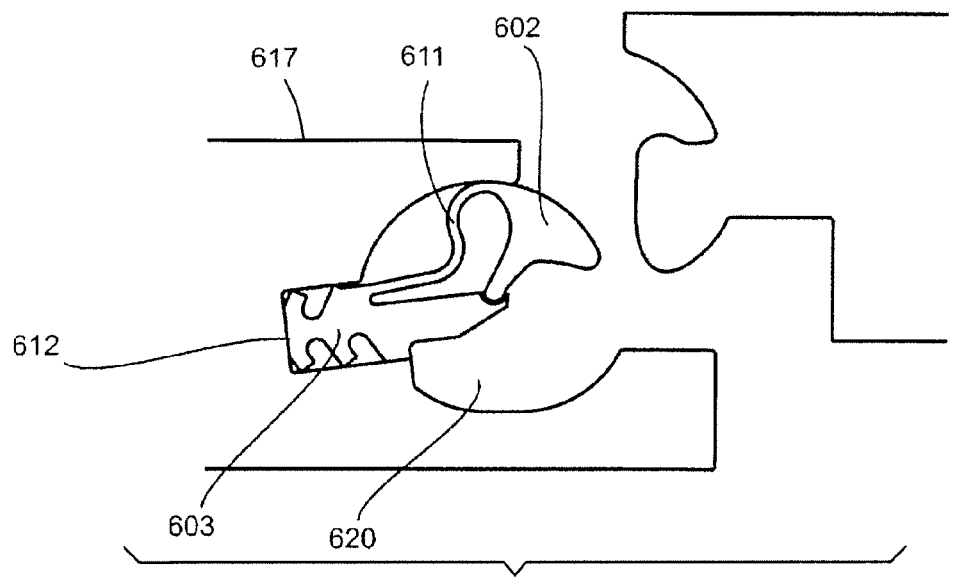
FIG. 24 shows a mechanical joint connection according to a sixth embodiment of the present invention during initiation of installation.
Figure 25:
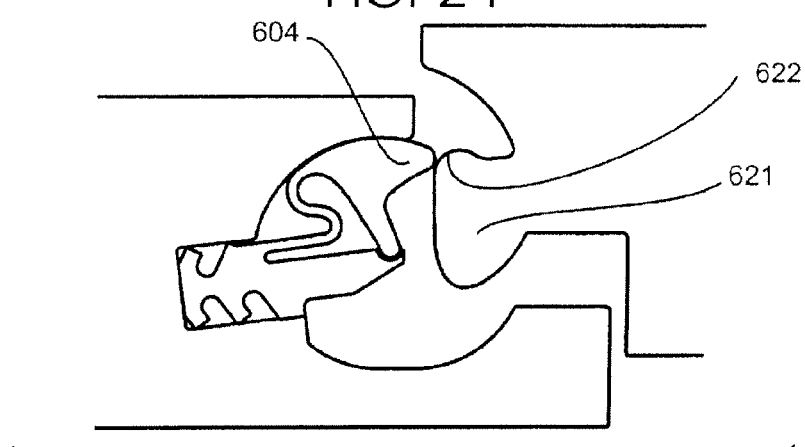
FIG. 25, shows the sixth embodiment just prior to completion of installation
Figure 26:
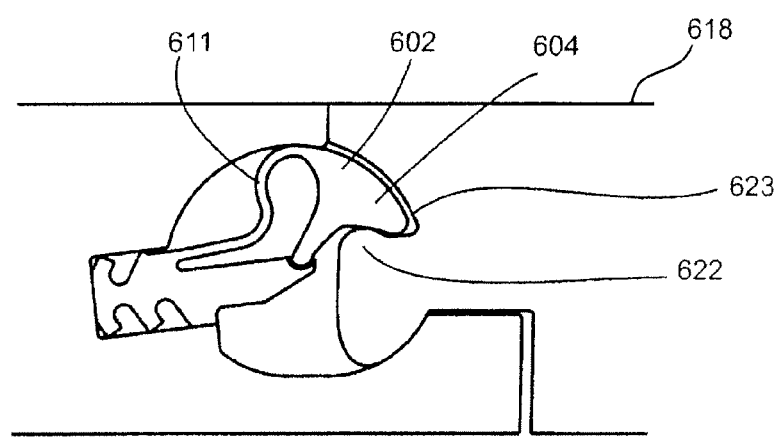
FIG. 26 shows the sixth embodiment in the closed installed condition.
Figure 27:
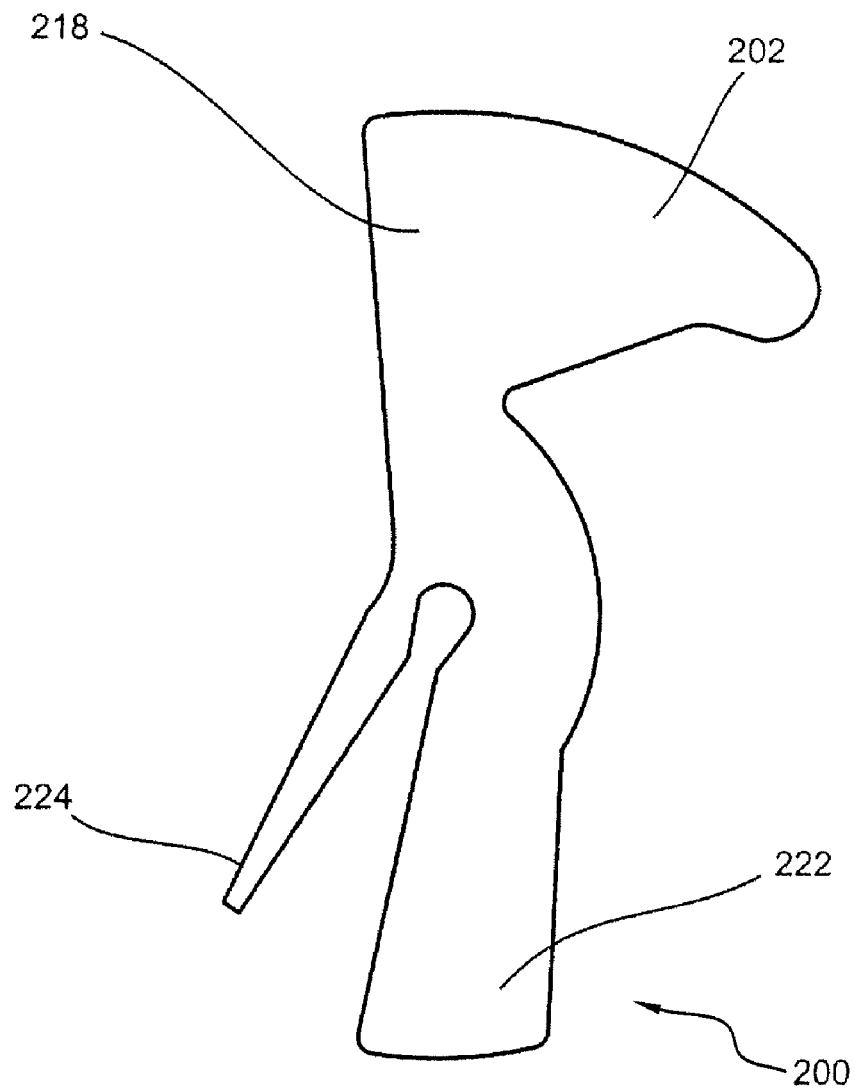
FIG. 27 illustrates a side view of an exemplary rotatable member according to the present invention.

FIGS. 24 through 26 illustrate the operation of a joint according to this embodiment of the present invention using the insertion member 600 of the first aspect illustrated in FIG. 22. In this embodiment, the insertion member 600 begins in the closed position in which the rotatable member 602 is rotated forward. In this position, the resilient coil 611 is at rest and the rotatable member 602 is swung forward to partially close the groove 620 formed in the first panel 617. In addition, the slot member 603 is secured within a slot 612 at the rear of the groove 620. Note that because the insertion member 600 has no second arm extending below the axis of rotation of the rotatable member 602, the lower portion of the groove 620 is substantially empty; however, it is understood to be within the scope of the invention that the groove may be formed much smaller, providing only enough space as is necessary to accommodate tongue 621, rather than making the groove to have a shape substantially similar to that of FIG. 15. In addition, it is also understood to be within the scope of the invention to place the slot 612 into which the slot portion 603 will fit much lower or at a greater angle in the rear groove 620 to provide maximum space in which the coil portion 611 can move.

As the tongue 621 enters the groove in FIG. 25, the tip 622 of the tongue 621 presses against the tip of head 604 causing the rotatable member 602 to rotate around the arcuate surface 606 into which the tip 610 of the rotatable member sits. As the rotatable member 602 rotates into the open position, the coil 611 is compressed, wound or contracted to place it under greater tension. When the tongue enters the joint completely and the tip 622 passes below the tip of head 604, the tension in the coil 611 is released and the rotatable member 602 swings back to its original closed position. In this embodiment, the tip 622 of groove 621 is slighter higher than the lower surface of the hook shaped groove 623. Because of this, the rotatable member 602 is able to secure the tongue and the second panel 618 in place in both a horizontal and vertical direction. By making the coil 611 as long as possible, the rotatable head will swing farther forward to close the groove providing for a deeper extension into the hook shaped groove 623 which provides greater strength and a more secure joint.

In the present invention, and in all of the exemplary embodiments discussed herein, the adjacent flooring panels are joined by lowering the panel having the tongue substantially vertically into the groove, with the adjacent panels coplanar relative to one another. Thus the joints of the present invention do not require rotational installation or horizontal snap-action installation. Because of this, the use of these joints is not limited to the exterior side edges of the flooring panel.

It is understood that the rotatable locking members and insertion members can be made of any material including metal, glass, wood, plastic, composite or fiberglass, but that it is likely that they will be made of a type of plastic because plastic provides the greatest flexibility and the greatest ease of manufacturing, depending on the particular shape of rotatable locking member. In addition, while the flooring panels may be made of medium or high density fiberboard (MDF or HDF) the flooring panels or their core material into which the tongue and grooves are formed maybe any of a variety of materials as well, including wood, particle board, chip board, or plastic.

What is claimed is:

1. A flooring panel, comprising:
   an interlocking joint having a first side defining a first mating portion along the first side and a second side defining a second mating portion along the second side, said second side disposed opposite said first side;
   the first mating portion having a substantially arcuate groove formed therein and extending along at least a portion of the first side;
   a rotatable cam disposed in the groove extending in a longitudinal direction along at least a portion of the first side;
   the rotatable cam having a central portion, a first arm extending radially outwardly from the central portion along a first axis, a second arm extending radially outwardly from the central portion along a second axis, and a resilient third arm extending radially outwardly from the central portion along a third axis and disposed a distance from the second arm defined by a predetermined angle;
   the first arm having a lever portion and a curved portion, the curved portion extending substantially perpendicularly to the lever portion defining a substantially hook-shaped end;
   a lower lip extending outwardly from the first mating portion beyond the groove;
   said second mating portion having a tongue extending perpendicularly from said second side and extending along at least a portion of the second side and defining a substantially concave groove along an undersurface receiving said lower lip;
   said tongue having a substantially vertical face at least as long as the distance from the hook-shaped end of the first arm to the end of the second arm;
   said second mating portion further defining a locking groove formed therein above the tongue to receive the hook-shaped end of the first arm of the rotatable cam; and
   the second arm and the resilient third arm bendable towards each other to create a biasing force,
   wherein the biasing force impels the second arm toward the tongue such that as the tongue advances in a direction toward the first mating portion, the hook-shaped end of the first arm moves into a mating position with the locking groove, thus providing a tight locking connection.

* * * * *